(12) United States Patent
Bacthavachalu et al.

(10) Patent No.: US 8,738,645 B1
(45) Date of Patent: May 27, 2014

(54) PARALLEL PROCESSING FRAMEWORK

(75) Inventors: Govindaswamy Bacthavachalu, Sammamish, WA (US); Peter Grant Gavares, Seattle, WA (US); Ahmed A. Badran, Issaquah, WA (US); James E. Scharf, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 13/096,915

(22) Filed: Apr. 28, 2011

Related U.S. Application Data

(62) Division of application No. 12/200,837, filed on Aug. 28, 2008, now Pat. No. 8,150,889.

(51) Int. Cl.
*G06F 7/00* (2006.01)
*G06F 17/30* (2006.01)

(52) U.S. Cl.
USPC ............................ 707/769; 707/770; 707/778

(58) Field of Classification Search
CPC ............ G06F 17/301; G06F 17/30445; G06F 17/30103; G06F 17/30424; G06F 17/30395
USPC .................. 707/770, 773, 778, 769, 775, 737
See application file for complete search history.

(56) References Cited

U.S. PATENT DOCUMENTS

| | | | |
|---|---|---|---|
| 5,021,949 A | | 6/1991 | Morten et al. |
| 6,546,403 B1 * | | 4/2003 | Carlson et al. ........................ 1/1 |
| 7,761,687 B2 | | 7/2010 | Blumrich et al. |
| 7,975,109 B2 | | 7/2011 | McWilliams et al. |
| 8,130,758 B2 * | | 3/2012 | Cohen ........................... 370/392 |
| 2002/0198872 A1 * | | 12/2002 | MacNicol et al. ................. 707/3 |
| 2008/0301256 A1 | | 12/2008 | McWilliams et al. |
| 2009/0006808 A1 | | 1/2009 | Blumrich et al. |
| 2009/0089544 A1 * | | 4/2009 | Liu ................................. 712/30 |

OTHER PUBLICATIONS

Aster Data, Inc., "Aster *n*Cluster: In-Database MapReduce, The 'Big Data' Analysis Challenge," 2008, located at <http://www.asterdata.com/product/mapreduce.html>, last visited on Aug. 28, 2008, 3 pages.
Greenplum, "MapReduce, The Power of Parallel Computing for Large-Scale Data Warehousing and Analytics," 2008, located at <http://www.greenplum.com/resources/mapreduce/>, last visited on Aug. 28, 2008, 7 pages.
U.S. Appl. No. 12/200,821, filed Aug. 28, 2008, for Govindaswamy Bacthavachalu et al.

* cited by examiner

*Primary Examiner* — Thanh-Ha Dang
*Assistant Examiner* — Merilyn Nguyen
(74) *Attorney, Agent, or Firm* — Kilpatrick Townsend & Stockton LLP

(57) ABSTRACT

Data can be processed in parallel across a cluster of nodes using a parallel processing framework. Using Web services calls between components allows the number of nodes to be scaled as necessary, and allows developers to build applications on the framework using a Web services interface. A job scheduler works together with a queuing service to distribute jobs to nodes as the nodes have capacity, such that jobs can be performed in parallel as quickly as the nodes are able to process the jobs. Data can be loaded efficiently across the cluster, and levels of nodes can be determined dynamically to process queries and other requests on the system.

24 Claims, 7 Drawing Sheets

PARALLEL PROCESSING FRAMEWORK

CROSS-REFERENCE TO RELATED APPLICATIONS

This application is a divisional of, and claims priority to, co-pending U.S. patent application Ser. No. 12/200,837, filed Aug. 28, 2008, entitled "Parallel Processing Framework," the entire contents of which are hereby incorporated herein by reference for all purposes.

BACKGROUND

In networks and other electronic environments, it is common for multiple users to send requests to a host, service, server, etc. As the number of users and requests increases, as well as the amount of information associated with each request, the number and/or size of resources needed to handle those requests increases as well. Unfortunately, the cost of purchasing and maintaining these resources can limit the amount of resources made available, which can reduce throughput and capacity, and can potentially cause users to move their data and/or processing to other providers.

For some users, such as enterprise users, the amount of data for any request can require a large, complicated system to process using existing approaches. For example, an enterprise user might desire to analyze information such as log, sales, and/or billing data for each previous day, which for certain enterprises might have terabytes of data. Other users might not have a large volume of data to process with each request, but may instead send a large number of requests at very high frequencies.

A conventional approach to handling such traffic involves utilizing a large enterprise database system or a data warehousing vendor that typically relies upon a proprietary hardware solution. Such approaches are expensive and limited in flexibility. Further, they do not provide scalability and flexibility with respect to the languages and protocols that can be utilized. Further, such approaches can be at least impractical for any particular user to implement on their own.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to processing information in an electronic environment. Systems and methods in accordance with various embodiments provide for distributed and parallel processing of data. Such an approach can be used with standard computing devices, and can scale as needed through the use of additional devices. Each device can act as a node of a tree to process the information, where the nodes of the tree are assigned dynamically based on factors such as load and anticipated results, such that the size of the overall tree can be reduced. A distributed scheduling component can assign the nodes and direct jobs as the nodes have capacity, such that the jobs can be performed quickly and efficiently in parallel across the nodes to perform tasks such as loading and querying data.

Figure 1:
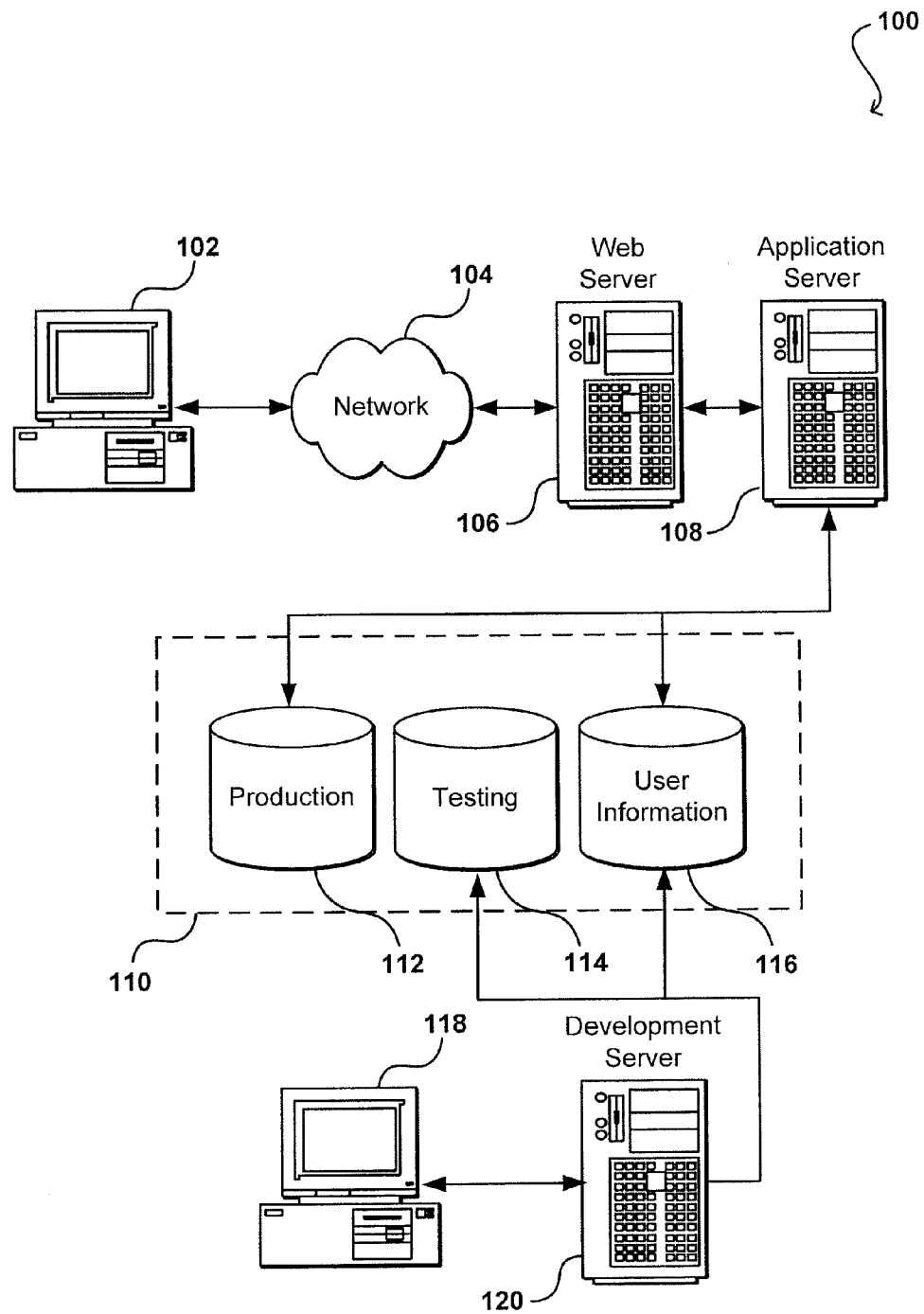
FIG. 1 illustrates an environment in which various embodiments can be implemented.

FIG. 1 illustrates an example of an electronic environment 100 for implementing aspects in accordance with various embodiments. As will be appreciated, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML or other such content for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
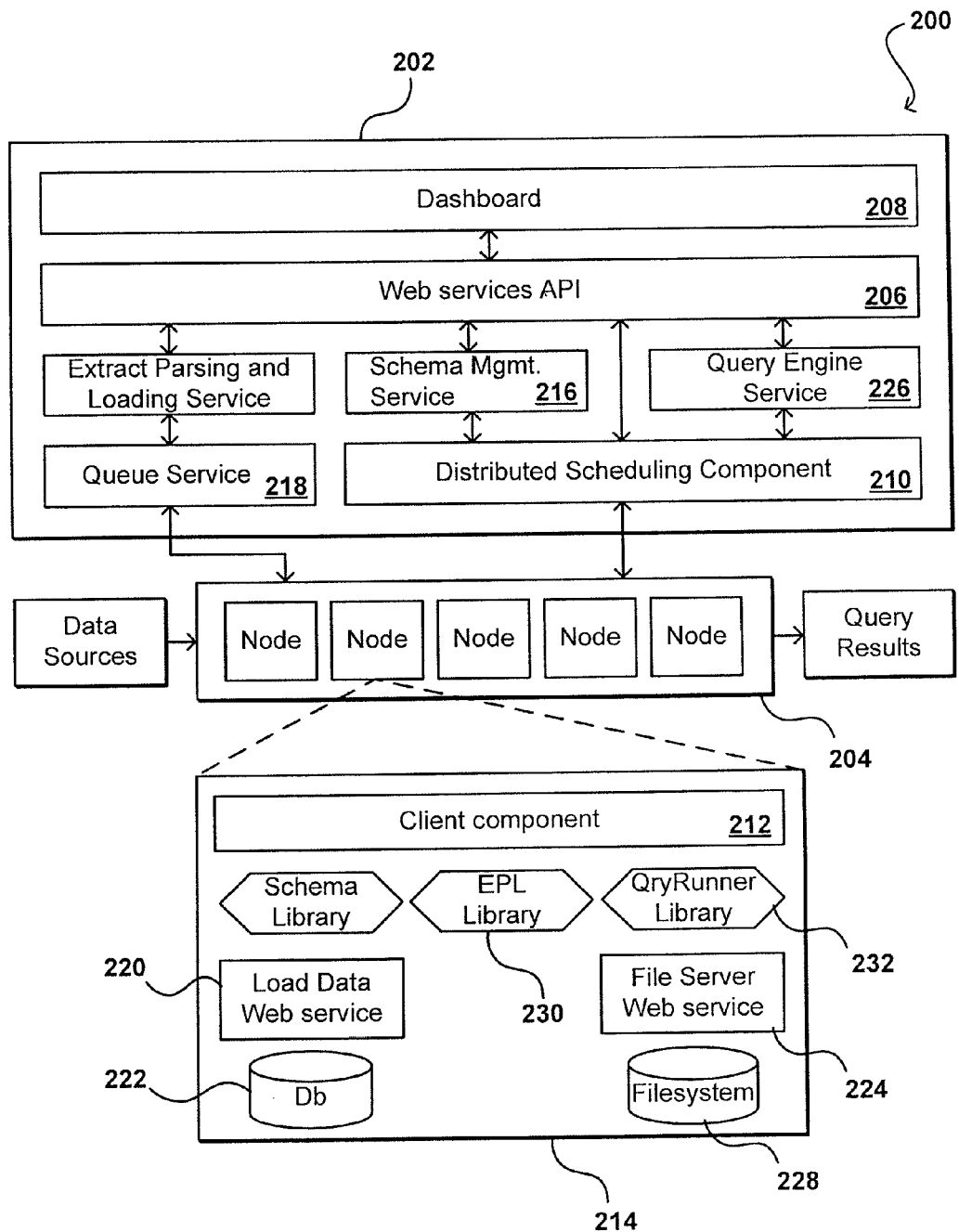
FIG. 2 illustrates an overview of components of a data processing system that can be used in accordance with one embodiment.

FIG. 2 illustrates components 200 of an example data processing framework that can operate in an environment such as that described with respect to FIG. 1. The framework includes a set of processing components 202 that work together with a set of nodes 204 to process large files, datasets, or other groupings of information. Each node can correspond to a standard computing device, such as an application server or other such computing device. A node also can correspond to an instance on a computing device, such that a device might include multiple instances corresponding to different nodes. A node also can include other processes, services, devices, or other such components, such as a virtual server or other such component. The number and type of nodes used can depend upon aspects of the implementation. The approach, however, allows for scalability up to thousands of nodes in a given implementation. In one example, multiple terabytes of data and/or processing can be distributed across clusters of small commodity servers.

In this example, an interface such as a Web service application programming interface (API) 206 is provided that can interface with various components of the system. Using such an interface, a developer can build new applications, or modify existing applications, based on the framework, and can make calls through the Web service API and/or any other appropriate APIs. The framework in this embodiment also provides a dashboard interface 208 that allows users or non-developers to manually select or otherwise specify or enter queries or instructions for utilizing the system. In one example, the dashboard in a simple graphical user interface (GUI) that enables users to load and query the distributed data without having to write any code.

The framework also includes at least one job scheduling component 210, which can comprise a dedicated device (e.g., server) or can take the form of a distributed scheduling service. The job scheduling component in one embodiment is a distributed and dependency-driven enterprise task or "job" scheduling device, module, system, and/or service. The job scheduling component enables users to schedule jobs, in series or in parallel, including recurring processing, and accounting for job dependencies, across multiple distributed nodes. Jobs, which can comprise any executable programs, requests, or instructions, can be submitted and configured via Web service calls. A job scheduling component can include a scheduling server that is able to perform tasks such as calculating the time needed to run jobs, calculating job dependencies, scheduling jobs across multiple nodes, monitoring job status, and providing support for job functions such as add, delete, update, kill, and/or restart. The system also can include a client component 212 that can be installed on each node 214. Each client component is able to perform tasks such as updating the scheduling server with information about node health, such as via a Web service heartbeat mechanism, as well as dequeuing jobs assigned to a node or node group work queue, executing the jobs, and updating updates the start and/or end status to the scheduling server.

The framework also includes a schema management component 216, which can comprise a device and/or service. A schema management component can perform tasks such as creating tables, deleting tables, and altering a retention policy of distributed databases of a system cluster. If a user wants a particular structure to the data, the tables can be created on each node according to a user-specified schema such that identically structured tables exist on each node, and the data can be loaded easily onto each such node. The schema management service can help to ensure that the proper tables are formed on the nodes according to the appropriate schema.

The framework in this example also includes a distribution queue 218. As with many other components described herein, the queue can comprise a device and/or service in different embodiments. A distribution queue 218 can balance information such as input data files across multiple machines. The distribution queue 218 also can be used to define metadata for loaded data in the distributed system. The distribution queue can keep track of file and/or block loaded node information which is used in case of node failure to redistribute the data to others nodes in the system. The system can include other services, such as a data loading service 220 that loads data into a data store 222 local to each node 214. A data loading service can allow users to plug in any desired storage engine and take advantage of the load data Web service. Data thus can be loaded into the distributed nodes using a load data Web service that can scale to thousands of nodes, in synchronous or asynchronous fashion, and that can periodically determine the load status and otherwise monitor the load process. The incoming data can be formatted as needed such that the service can successfully load the data into the local data store.

The system also can include a file transfer service 224 to assist in copying files between nodes. The file transfer service can be used by a query engine service 226 to move the data between nodes and file systems 228 of the nodes, for example. The file transfer service also can be used with the dashboard to allow for the viewing of log files in the distributed cluster. Each node also can contain a library referred to herein as an extract parse and load (EPL) library 230, which can be a default library used to load terabytes of data into the cluster of nodes.

The query engine service 226 can accept information such as query input from a user. A user in one embodiment specifies at least three pieces of information: an "instance query," a "summary query," and an output location. The "instance query" is a query to be executed on every node used to process the user request, and may take the form of a structured query language (SQL) statement or a command line executable, for example. A "summary query" may take a similar form, will instead be executed on a subset of nodes, and is used to summarize data results from the instance query across the distributed cluster of nodes as will be discussed later herein. It should be understood that the term "query" as used herein can refer to any approach known or used in the art for requesting or otherwise accessing data or information as would be apparent to one of ordinary skill in the art, and although SQL statements will be used for purposes of simplicity of explanation, any appropriate querying technique can be used within the scope of the various embodiments.

The output location may include any appropriate location, address, device, etc., for storing the output, such as a data store, storage service, email message, or a local file system. In some embodiments, the output location also can serve as an input location or other source of data allowing for further processing and/or querying. Advanced options can allow users to upload custom code libraries to execute across the distributed cluster. Once the query input is received, the query engine service can create and schedule jobs across the cluster, and execute summary jobs using a tree factor summarization as discussed elsewhere herein. A library such as a query runner library 232 in each node can be responsible for executing queries based on parameters received, then pass the results to the next node in a specified location. A final summary job then can output final results back to a designated location.

As mentioned above, such a framework can provide for parallel computing with high performance and scalability using standard computing components with the various nodes of the system. High efficiency and throughput can be obtained for both loading and querying of data in a way that can provide for interoperability with a plurality of systems, languages, platforms, protocols, etc. Such a system can provide continuous loading with functions such as data retention and querying that typically are not available for large data systems. Since the framework in at least several embodiments is built around the use of services, such as Web services, the system can easily scale to thousands of nodes without need for manual reconfiguration, recoding, etc. The framework then can accept a large set of data, separate the data into multiple data subsets, and then distribute the data out to various nodes across the system or cluster. The framework subsequently can receive a request or query that treats the distributed subsets as a single dataset on a single database, for example, such that a user can access the data without having to have any knowledge as to where the data is actually stored, how it is separated, etc. The framework can issue a received user query in parallel to each node with data for the query, and can ask each node to return the data or information corresponding to the query. The information that is reported back from the various nodes then can be summarized or further analyzed on a smaller set of nodes that are assigned or otherwise determined for the query, in order to finally report back cumulative data for the user query. A single answer then can be returned in an efficient manner that will appear to the user as if the query had been entered into a single, large data warehouse, but is more efficient and less expensive.

The use of Web services throughout the framework also allows developer to integrate directly into the system. Whether feeding data into the system or submitting queries to obtain data out of the system, developers can take advantage of standard Web services protocols that allow any system or platform to work with the processing framework.

The distributed scheduling service 210 can include a job store (such as local memory, etc.) that can store information for all the jobs to be executed for a user request, for example, as well as any dependencies between jobs. A first job can be designated to execute on a first node and a second job on a second node, and the scheduling service can monitor the job on each node. If one of the nodes fails, the scheduler can restart the job(s) for that node and/or move the job(s) to another node. As discussed, the designating, monitoring, and moving of jobs can all be done via Web services calls. In this example, the scheduler might designate the first and second jobs to execute in parallel. Once both those jobs have executed, a summary job can be designated to execute on a third node (which in one embodiment can be one of the first two nodes or a different node) and accept the input from the first two nodes. This scheduling of jobs in one embodiment involves issuing commands to the scheduling server via Web services, as well as the scheduling server communicating with each of the child nodes via Web services. The scheduling service can execute any type of job in any language (e.g., Perl, C, C++), and the service is very extensible as any developer seeking to extend the system or build on top of the system can utilize any appropriate language to make a Web services call. The use of Web services also allows for significant scalability, decoupling of the clients and servers, ease of load balancing, etc. The scheduler can schedule thousands of jobs across the nodes of the system, taking into account the various dependencies, etc. Once the schema is selected and the tables created across the node cluster, the load data web service can be used to load data into the system.

Once the data is loaded across the cluster according to the schema, a user can query or otherwise access the data. The user thus can take advantage of the query engine service 226. The query engine service in one embodiment utilizes two required stages and one optional stage, although additional or fewer stages can be used in other embodiments. In this embodiment, the query engine service utilizes an initial or "instance" stage, wherein a first query executes on each node or instance storing data for the query, and a summary stage that operates on at least one node and generates a final result or summary in response to the query, once the data for all the instances is collected in one place. In some cases a user might wish to perform various operations or transformations on the data, and might submit an intermediate query for an optional intermediate stage, wherein the intermediate query will execute on a subset of the nodes. The user also can specify a location for the results, such as a table or email message. The information can be accepted as inputs through a Web services call to the system, which can be submitted through the dashboard or Web services API, for example. The query engine service 226 registers the query and provides the pertinent information to the scheduling service 210 to schedule the necessary jobs. Each node includes a query library 232 in order to execute the jobs, such that the client component 212 is able to receive information for the job, determine how to execute the job, then execute the job and pass the results on to the appropriate node. While libraries such as schema libraries and EPL libraries can be included on each node as discussed above, users also can insert code onto the nodes by allowing users to upload custom libraries, which can be used to perform functions such as data transformation. The user can simply submit the library, and the system will distribute the library to all the appropriate nodes.

When loading data into the system, it is desirable in many instances to relatively evenly distribute the load across the cluster of nodes. The framework in one embodiment utilizes the queuing service 218 to distribute the data across the nodes. The queuing service can accept a definition for the data, and any appropriate metadata, and store that data to a queue. The queuing service then can dequeue the data one file, block, or grouping at a time. Each grouping of data can be sent to at least one node for processing and loading into the system. When a node finishes processing a group, another group can be dequeued until all the data is dequeued. In this way, each node takes data as quickly as possible which not only causes the data to be loaded more efficiently, but also helps to dynamically spread the data across the system based on factors such as load and capacity. The queue in at least one embodiment is a block queue, which allows a user to decide the size or grouping of data to be distributed across the system.

Figure 3:
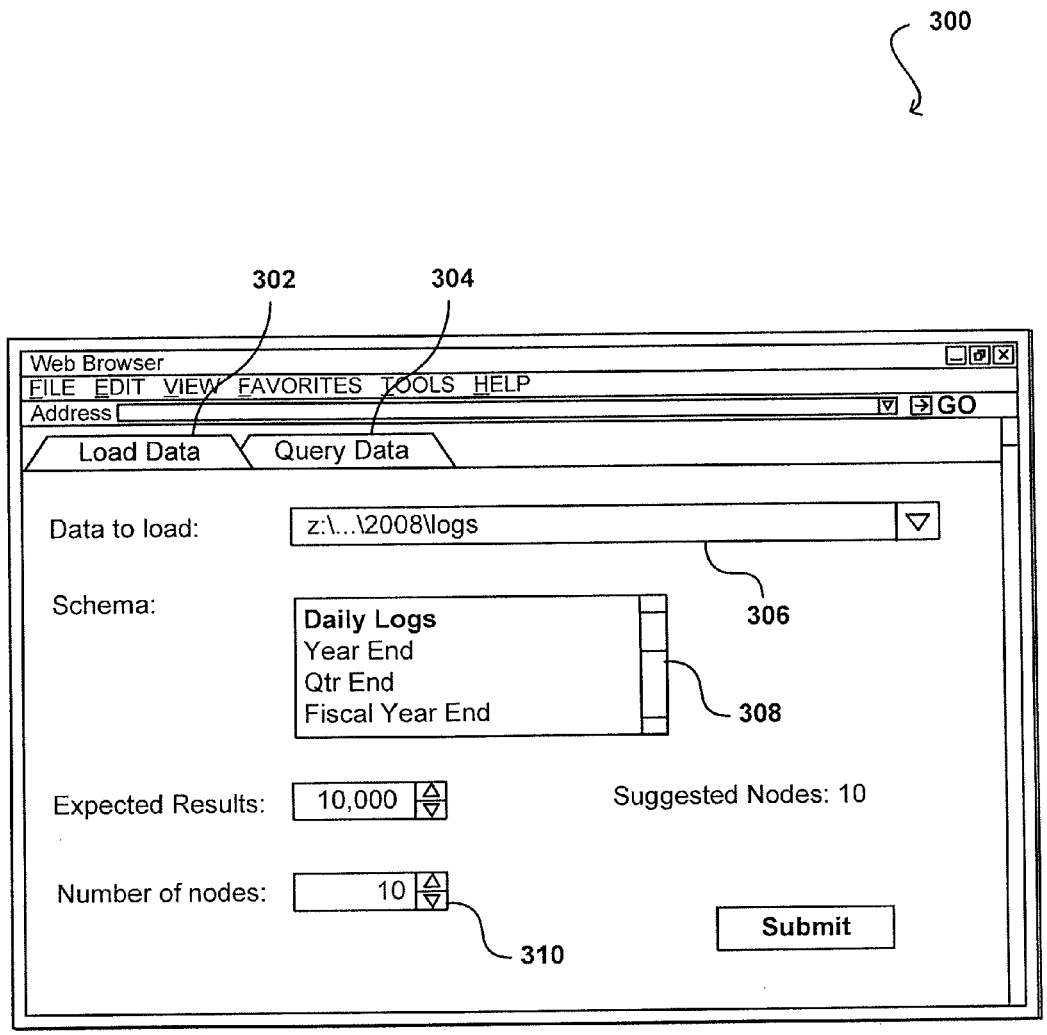
FIG. 3 illustrates an interface that can be used in accordance with one embodiment.

When loading data through a dashboard, for example, a user can be presented with an interface page 300 such as the example illustrated in FIG. 3. The interface can have tabs or other options used for loading 302 and querying 304 the data. In this example, a user can create and submit a Web services call to be submitted to load the data. In this example, the user specifies a location of the data to be loaded using a data source option 306. The user also can specify a schema to be used in creating the tables and loading the data, using a schema select option 308. In some embodiments, a user can be asked to submit an expected number of results, such that the system can display to the user a predicted number of nodes to use for the data. The user then can select a number of nodes to use for the data through a blocking option 310, and can submit the Web service call to be generated using a submit or similar option 312. For example, a user can submit a Web service call that indicates a particular file is to be distributed across ten nodes, etc. In other embodiments, the system can analyze the file and/or aspects of the system and automatically determine how many nodes to use to load the data. The system thus specifies how many instance nodes should be used, but does not specify how much data is to be loaded on each node, as the nodes themselves control the relative distribution, as nodes with a higher load or slower speed will not be able to consume as many files. The nodes can, however, load the data in parallel until all data is loaded.

The information as to where the data is loaded is maintained such that the system is able to perform queries on the data. This information is also needed if a node becomes at least temporarily unavailable. When a node becomes unavailable, the system can determine the data that was dequeued to that node, such that the system can load the data into the queue and dequeue the relevant data to other nodes in the cluster. This allows for quick failure recovery using Web services calls.

Figure 4:
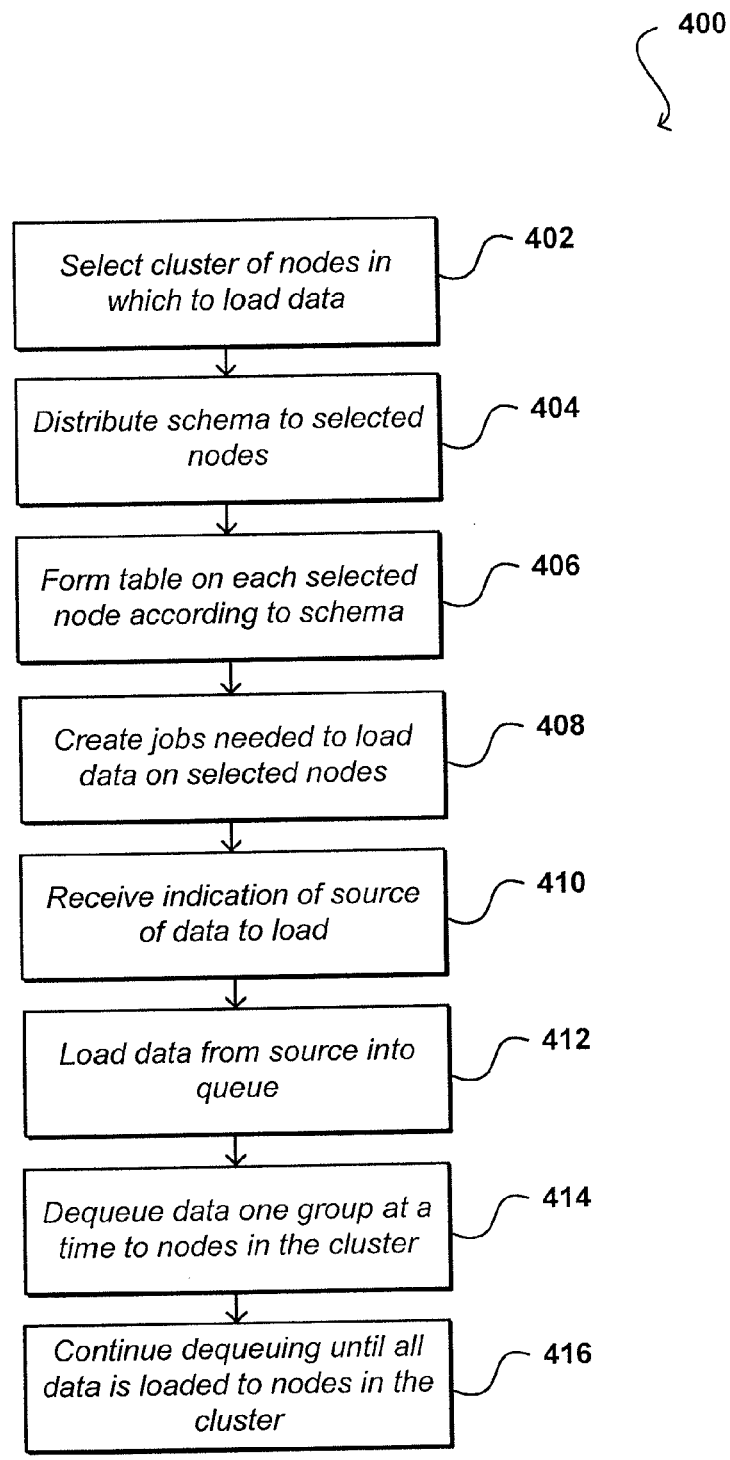
FIG. 4 illustrates steps of a method for loading data that can be used in accordance with one embodiment.

FIG. 4 illustrates steps of an example method 400 for loading data into the system using a framework as described with respect to FIG. 2, in accordance with one embodiment. There can be additional or fewer steps in other embodiments, and various steps can be performed in various orders. In this method, a cluster of nodes is selected to load the data 402. A schema is specified to be distributed to the selected nodes 404, and at least one table is formed on each specified node according to the schema 406. A number of jobs are created based on the data to be loaded and the number of selected nodes 408. A source of data to be loaded also is specified 410. Once all the tables are created and metadata for the tables are distributed to the selected nodes, the data is loaded into a queue 412 and the data is dequeued one group at a time to the various nodes 414. The data is parsed and loaded into the system continuously and in parallel among the selected nodes until all the files are processed from the queue 416. As discussed, the queuing process can be monitored through a scheduling dashboard, and the dashboard or a Web services API can be used to make the Web services calls into the system. The dashboard can provide status information such as what percentage of the data is loaded and whether any nodes have failed, for example. Such an approach also can support compression, such that the data stored in the nodes can be partially or fully compressed.

Figure 5:
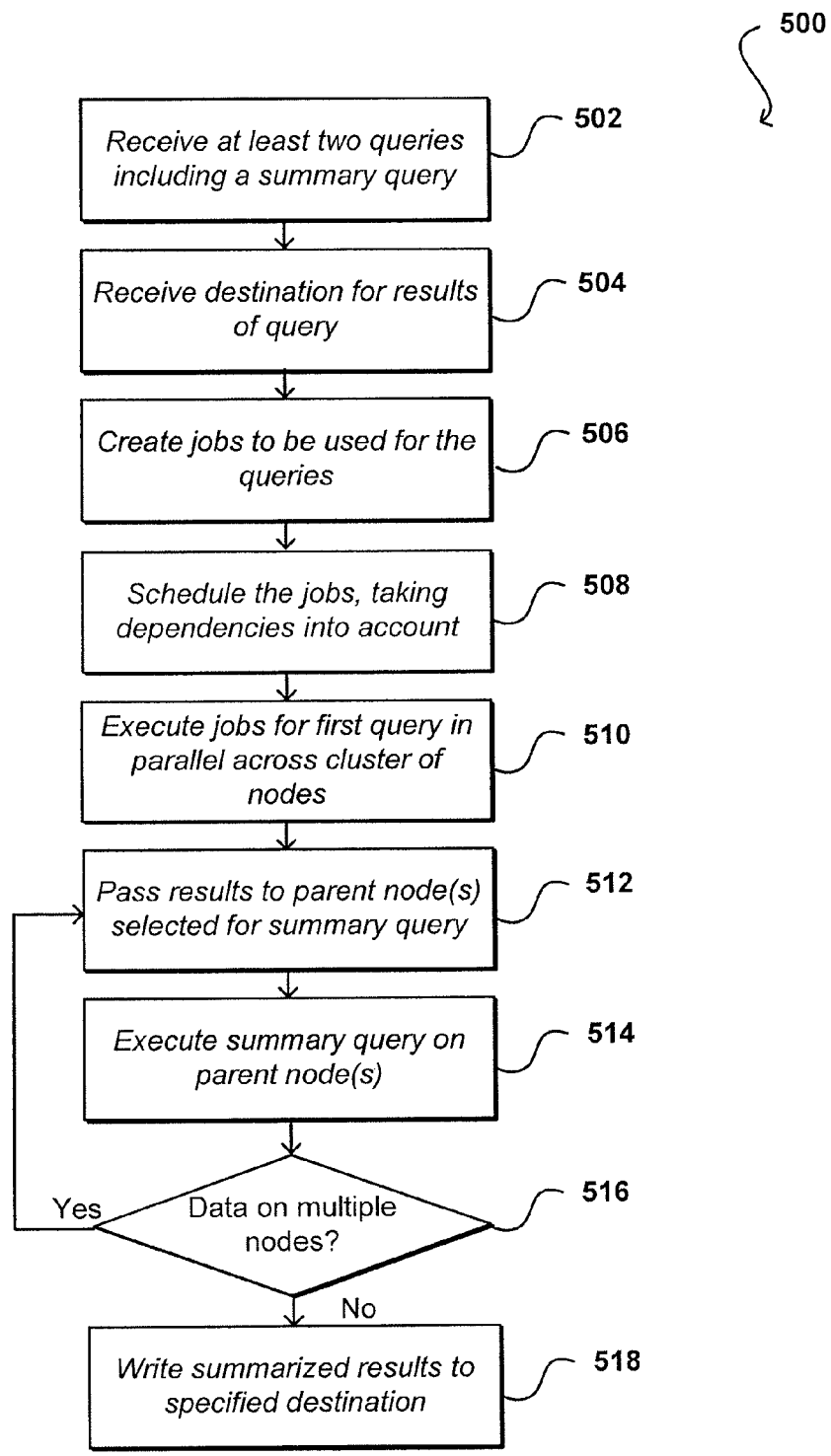
FIG. 5 illustrates steps of a method for querying data that can be used in accordance with one embodiment.

Once the data is fully loaded into the system, a user can begin to query the data. FIG. 5 illustrates steps of an example method 500 in accordance with one embodiment for querying the loaded data using a system such as that described with respect to FIG. 2. As discussed, at least two queries are received in this embodiment, an instance query and a summary query 502. In one example, an instance query might ask for a count of the number of rows meeting a certain criteria, and the summary query might ask to sum the total count from each node. In some embodiments a user can submit additional intermediate queries as discussed above, and in other embodiments a user does not need to submit a separate summary query as the system will automatically summarize the results based on the instance query. A destination for the results of the query also is received 504, although in some embodiments the destination can be selected separately or ahead of time, or may be otherwise determined. Based on the received queries and any metadata for the stored data, a set of jobs is created to be used in querying the data 506. The jobs for the instance and summary queries are then scheduled, accounting for any dependencies between jobs 508. The instance jobs are executed in parallel, with each node executing at least one job at any time a job is available 510. Once the instance jobs are completed, the results of the instance jobs are passed to the nodes for the summary jobs (or any intermediate jobs) 512 and the summary jobs are executed on the selected nodes 514. As discussed, there may be multiple levels of summary jobs such that data has to be passed to the appropriate node(s) for summarizing. If the data exists on multiple nodes 516, the process continues with data being passed to the parent node and a summary query executed on each parent node. Once all the results are summarized, the results are written to the specified destination 518.

Figure 6A:
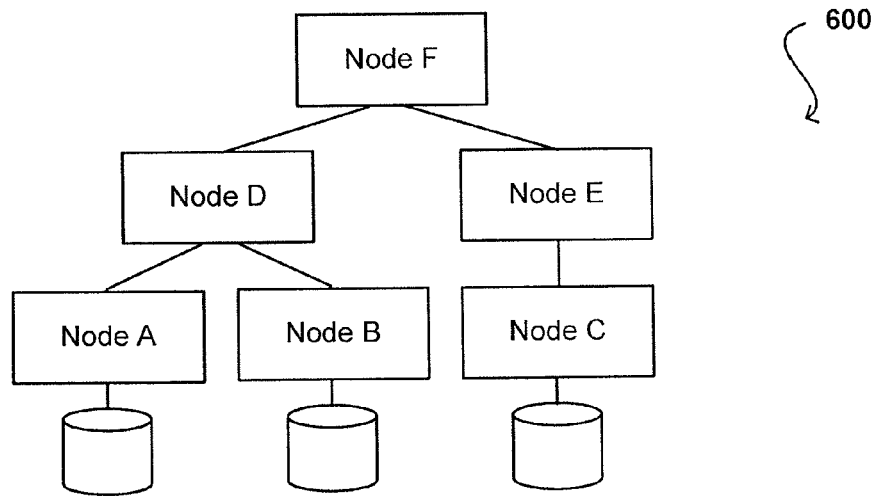
FIGS. 6(a) and 6(b) illustrate a node structure and table structure, respectively, that can be used in accordance with one embodiment.

In some cases, the results of the instance queries on the various nodes might be too large to summarize or otherwise process on any single node. In such a case, there may need to be multiple levels of summarization in order to handle the full set of results. For example, FIG. 6(a) illustrates an example node tree 600 wherein a first layer of nodes (A, B, C) each stores data locally that is used to process an instance query. The results of the instance queries are passed to a second layer of nodes (D, E) that perform summarization on the instance results. The summarization results are then passed to a third level of nodes (F), which does the final summarization. It should be understood that the number of levels and nodes can vary as discussed herein. Further, if there are intermediate queries, then these queries also will need to be handled by another set of nodes, and will create at least another level of nodes in the hierarchy.

Systems and methods in accordance with various embodiments dynamically generate the node hierarchies, such as that shown in FIG. 6(a), in order to maximize efficiency of querying data by assigning jobs at the appropriate number of levels for a query. In conventional approaches, a projection SQL is run on the nodes in the cluster to determine a node to accept the results. Such an approach can be very inefficient when dealing with very large datasets, since the final processing node has to accept and process a very large result.

Since a cluster of nodes exists that has the data loaded as discussed above, commands such as SQL or other querying commands can be issued to execute an instance query for the distributed data on each node. The instance results can be stored locally on each node, in some embodiments, and a reference to the results can be placed in a queue service such as discussed above. Using a merge ratio or tree determination algorithm, for example, the system can determine a next set of nodes to handle the results of the instance queries. If there is at least one intermediate query, then the next level will handle the intermediate query. If not, the next level will begin executing the summary query. Once the next set (or level) or nodes is determined, the jobs can be scheduled for those nodes and sent when the instance query data is finished and available. The next level of nodes can then copy the instance data from the first set of nodes, and execute the appropriate intermediate or summary query, in effect reducing the overall result set with each execution at each level. The process continues until a next level of nodes is determined that only contains a single node, wherein a final summary query can be executed and the result output to the destination specified by the user.

Referring back to the system diagram of FIG. 2, the system can include a query runner library 232 on each node, such that various queries can be run against the local data store 222 for each node 214. This component can be configurable to run other executables as well, although a default implementation can be used to execute queries. The queue service 218 can again be used to enqueue and dequeue data. The service can load balance data blocks or files amongst multiple nodes during the query process, which can help distribute the work load during different phases of the tree reduction. The file server Web service 224 can assist in copying files between nodes, as discussed above, being active in each node and accepting requests to transfer data between nodes.

When a user submits a query, it can be desirable to hide all information from the user relating to the number and levels of nodes used to process the query, as well as other such information. When the user submits an instance query, a series of jobs will be created in the system as discussed above that are sent to specific nodes that will execute the instance query on the local data stores. The query sent to each node can be modified or "wrapped" to include information such that the result of the query creates another table, such as may be given a random or otherwise unique identifier (ID). The results from the instance query then can be placed into this temporary table for each node processing an instance query. Since each node has executed the same instance query on an identically structured table, the temporary tables will have the same structure.

Figure 6B:
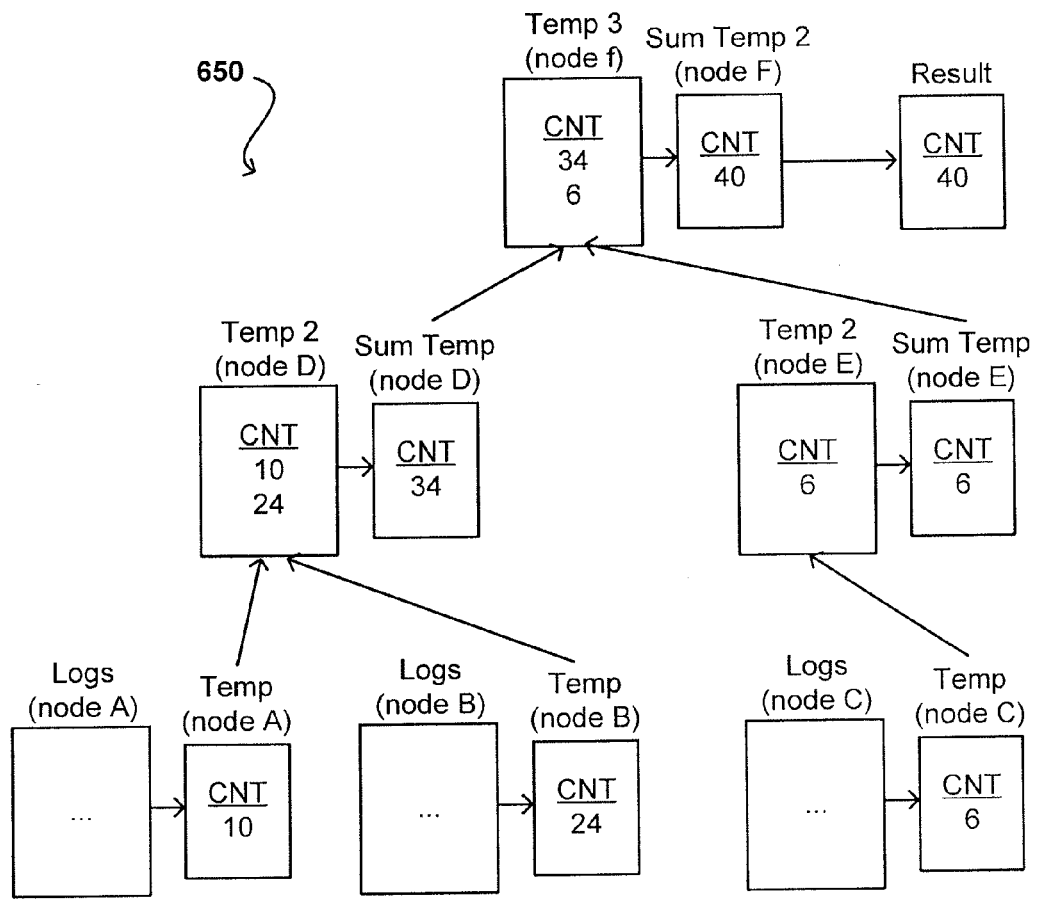

An example of this is shown in the table hierarchy 650 of FIG. 6(b). Each node in this example processes a table from a local data store, here a "Logs" table. The instance query for each node causes a table to be created, here referred to as "Temp". The results of the instance query for each node, here a count ("CNT"), is stored in the temp table for that node. The results in the temporary tables then can be transferred to the assigned parent node as designated by the scheduling service. When the parent node receives the job and query from the scheduling service, the parent node creates another temporary table according to the schema and copies in the data from the temporary tables from the child nodes. In this example, the new temporary table on each parent node is referred to as "Temp 2." The two parent nodes in this example thus have the results of the instance query from all their child nodes inside the temporary table.

Since there are no intermediate queries in this example, each of nodes D and E executes a summary query, which results in a data set that defines a table structure, and another temporary table is created on each respective node, herein referred to as a temporary summary or "Sum Temp" table. The steps of creating another table and inserting the data from each node into that table for a parent node are repeated, creating table "Temp 3" which contains the results from nodes D and E. Since there is only one node at this top level, the summary query is executed regardless of the presence of any intermediate queries. A temporary summary table can be created to store the results of the summary query, until the results are stored to the location specified by the user.

In this example, it is assumed that a process has inserted log entries into the table for each instance node. The example assumes that an instance query is submitted that wants to obtain a count of all records having a specified aspect, such as each log entry for a previous day. The instance query thus can look like the following:

Instance query
  select
    count(*)"CNT"
  from
    logs

The instance query will cause each node at the bottom level to generate a count of records from the "logs" table in the local data store. The user (or application, system, or process) also will submit a summary query that will sum the counts for each instance node. This summary query can look like the following:

Summary query
  select
    sum(CNT)
  from
    ——TABLENAME——

The instance query in this example obtains a count of all the rows in the system that are in the logs table. The result is given the name CNT, which in this example is the column name in the temporary table. The column includes one value in this example, the count of the total rows in the logs table for that node. Each instance node thus will have an identically structured table with one row and one column called CNT. The parent node creates an identical table with a slightly different name to avoid collisions in the data store, etc. This table will include CNT and will have the results from all the respective child nodes. Since users will not know the names of the intermediate or temporary tables, a wildcard or other such character can be used in the query and the system can fill in the table names as needed. The process continues until the final result is obtained at the final parent node.

In conventional systems, a user would have to try to load all data into a single device and then execute a single query. Such an approach can be problematic when the data set gets sufficiently large, as the performance of the system can decrease significantly. Further, such an approach would require expensive, specialized hardware. In the distributed approaches described herein, relatively inexpensive and conventional computing devices can be used to perform the processing in a distributed, parallel fashion. Further, such an approach allows for the number of nodes and/or levels used to process the data to be determined and/or adjusted dynamically, such as may depend upon the size of the data set for each request. The depth (e.g., number of levels) of the processing tree can be based in part on the number of nodes and the size of the data set. A query such as an intermediate or summary query then can be repeated at multiple levels if necessary, depending upon the depth of the tree and the capacity of the nodes. In such a system, once the data is loaded into the nodes then there will not be a need to reparse the data. Any number of queries can be executed against the data, and these queries can run in parallel as discussed above. Further, each node can have multiple tables loaded and can be running queries in parallel against different tables.

When determining the node structure dynamically, the query engine service can take all the nodes and "shuffle" them, and then can assign jobs and choose nodes randomly. In other embodiments, the query engine service can select nodes based on factors such as load, performance, and capacity. The scheduler can determine factors such as the number of nodes needed for the various jobs, etc. In some embodiments the depth of the tree structure can be determined at least in part by the user, who can specify factors such as how large the result set is expected to be. In other embodiments, each layer is created and the number of nodes assigned based upon results of processing the previous layer. Other embodiments determine the tree structure automatically based on factors such as load on the system, size of the data set, aspects of the query, etc. A schema manager or other component also can collect statistics about the system, each node, etc., such that when enough data is available the necessary tree structure can be predicted relatively accurately.

Figure 7:
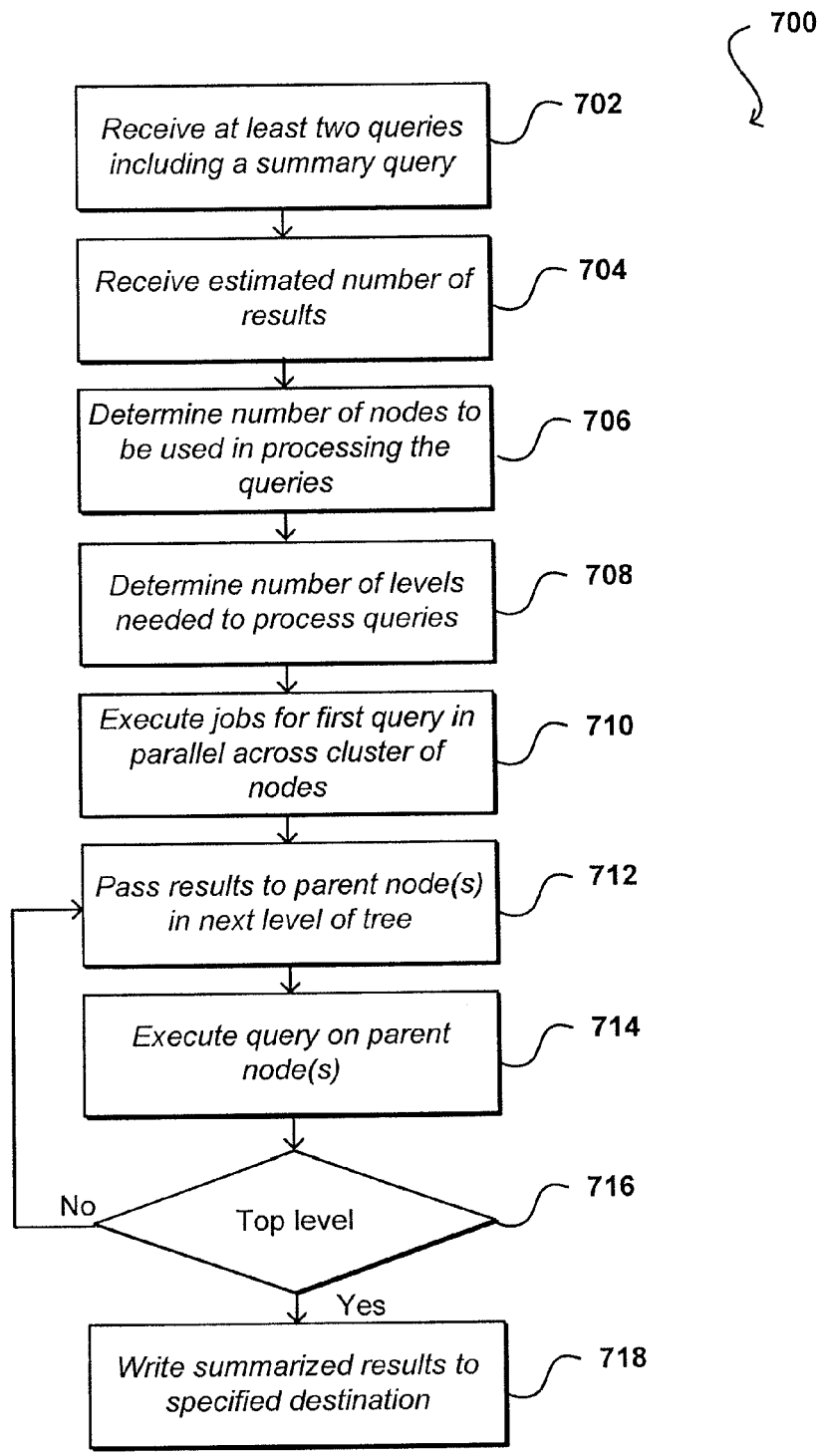
FIG. 7 illustrates steps of a method for processing a request that can be used in accordance with one embodiment.

FIG. 7 thus illustrates steps of a method 700 for querying data using a reduced tree structure in accordance with one embodiment. In this example, two queries are received from the user 702. An estimated number of results also is received 704. In one embodiment the estimated results are received from the user, but in other embodiments the number can be received from an application, service, or process, for example. Based on the estimated number of results and information about the nodes of the system, a number of nodes to be used in processing the queries is determined 706. In some embodiments a user selects the number of nodes to use, which can be suggested by the system, while in other embodiments an algorithm can be used to select the number of nodes based on the predicted and/or historical information for the system. Once the number of nodes to be used is determined, a tree determination algorithm, merge ratio, or similar process is used to determine the depth and/or number of levels of the tree, as well as dependencies between the levels, to be used in processing the queries 708. As discussed above, each node can only process so much data at any time, such that it might be necessary to execute an intermediate, combine, and/or summary query multiple times at different levels. The algorithm in one embodiment thus can determine the minimum number of levels and parent nodes needed to process all the data for the query. In other embodiments, such an algorithm might base the number of levels and/or parent nodes on factors such as efficiency and processing time.

Once the number of nodes and levels is determined, jobs are created and scheduled that are distributed initially to at least the first level of nodes, accounting for any dependencies between jobs 710. Once the instance jobs are completed, the results of the instance jobs are passed to the nodes for the next level, which can include intermediate, combine, and/or summary jobs 712 and the next level of jobs are executed on the selected nodes 714. As discussed, there may be multiple levels of jobs such that data has to be passed to the appropriate node(s) for summarizing. If the process is at the top level and the data is summarized on a single node, the results are written to the specified destination 718. Otherwise, the process continues with data being passed to the next level of nodes and a query is executed on each node of that level.

As discussed above, the various embodiments can be implemented in a wide variety of operating and/or electronic environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of querying data from a system including a cluster of nodes, comprising:

under control of one or more computing systems configured with executable instructions, receiving an instance query and a summary query, wherein the instance query provides for data transformation and the summary query provides for combining one or more results from the instance query, the instance query distinct from the summary query;

determining a first set of nodes of the cluster that stores data corresponding to the instance query;

scheduling a plurality of jobs corresponding to the instance query and the summary query, each job to be executed on a single node;

causing each of the first set of nodes to process the instance query, at least a portion of the first set of nodes operable to process the instance query in parallel;

determining a second set of nodes, each of the second set of nodes being a parent node to at least one child node of the first set of nodes in a hierarchical node structure, wherein at least one node is able to reside in the first set and the second set of nodes such that the at least one node may operate as a child node during processing of the instance query and a parent node during processing of the summary query;

causing each of the second set of nodes to process the summary query using results from the instance query on each respective child node; and storing results of the summary query to a specified location.

2. The computer-implemented method of claim 1, further comprising:

determining at least a third set of nodes to process results using the summary query, each of the third set of nodes being a parent to at least one child node of the second set of nodes and operable to process results of the summary query of each child node.

3. The computer-implemented method of claim 1, further comprising:

receiving an intermediate query;

determining at least a third set of nodes to process the intermediate query, each of the third set of nodes being a parent to at least one child node of the first set of nodes and a child to one parent node in the second set of nodes; and causing each of the third set of nodes to process the intermediate query using results from the instance query on each child node, wherein each of the second set of nodes is able to further process the summary query using results from the intermediate query on each child node.

4. The computer-implemented method of claim 1, wherein the hierarchical node structure is formed dynamically based at least in part upon the instance query and the summary query.

5. The computer-implemented method of claim 1, wherein the cluster of nodes communicates using Web services and is scalable to add additional nodes.

6. The computer-implemented method of claim 1, wherein each node comprises at least one of a computing device and an instance on a computing device.

7. The computer-implemented method of claim 1, further comprising:
tracking dependencies between jobs such that jobs for the second set of nodes are not processed until one or more corresponding jobs for the first set of nodes are processed.

8. The computer-implemented method of claim 1, further comprising:
passing results from each of the first set of nodes to a corresponding node of the second set of nodes using a file transfer service.

9. The computer-implemented method of claim 1, further comprising:
enabling a user to upload a library to replicate to each node for use in processing at least the instance query.

10. The computer-implemented method of claim 1, wherein the second set of nodes is determined dynamically based upon at least a current capacity of each node at a time for processing the summary query.

11. A system for querying data from a cluster of nodes, comprising:
a processor; and
a memory device including instructions that, when executed by the processor, cause the processor to:
receive an instance query and a summary query;
determine a first set of nodes of the cluster that stores data corresponding to the instance query;
schedule a plurality of jobs corresponding to the instance query and the summary query, each job to be executed on a single node;
cause each of the first set of nodes to process the instance query, at least a portion of the first set of nodes operable to process the instance query in parallel;
determine a second set of nodes, each of the second set of nodes being a parent node to at least one child node of the first set of nodes in a hierarchical node structure, wherein at least one node is able to reside in the first set and the second set of nodes, such that the node may operate as a child node during processing of the instance query and a parent node during processing of the summary query;
cause each of the second set of nodes to process the summary query using results from the instance query on each respective child node; and
store results of the summary query to a specified location.

12. The system of claim 11, wherein the memory device further includes instructions that, when executed by the processor, cause the processor to:
receive an intermediate query;
determine a third set of nodes to process the intermediate query, each of the third set of nodes being a parent to at least one child node of the first set of nodes and a child to one of the nodes in the second set of nodes; and
cause each of the third set of nodes to process the intermediate query using results from the instance query on each child node,
wherein each of the second set of nodes is able to further process the summary query using results from the intermediate query on each child node.

13. The system of claim 11, wherein the memory device further includes instructions that, when executed by the processor, cause the processor to:
determine at least a third set of nodes to process results using the summary query, each of the third set of nodes being a parent to at least one child node of the second set of nodes and operable to process results of the summary query of each child node.

14. The system of claim 11, wherein the hierarchical node structure is formed dynamically based at least in part upon the instance query and the summary query.

15. The system of claim 11, wherein the cluster of nodes communicates using Web services and is scalable to add additional nodes, and
wherein each node comprises at least one of a computing device and an instance on a computing device.

16. The system of claim 11, wherein the memory device further includes instructions that, when executed by the processor, cause the processor to:
track dependencies between jobs such that jobs for the second set of nodes are not processed until one or more corresponding jobs for the first set of nodes are processed.

17. The system of claim 11, wherein the second set of nodes is determined dynamically based upon at least a current capacity of each node at a time for processing the summary query.

18. A computer program product embedded in a non-transitory computer-readable storage medium for querying data from a cluster of nodes, comprising:
program code for receiving an instance query and a summary query, wherein the instance query provides for data transformation and the summary query provides for combining one or more results from the instance query, the instance query distinct from the summary query;
program code for determining a first set of nodes of the cluster that stores data corresponding to the instance query;
program code for scheduling a plurality of jobs corresponding to the instance query and the summary query, each job to be executed on a single node;
program code for causing each of the first set of nodes to process the instance query, at least a portion of the first set of nodes operable to process the instance query in parallel;
program code for determining a second set of nodes, each of the second set of nodes being a parent to at least one child node of the first set of nodes in a hierarchical node structure, wherein at least one node is able to reside in the first set and the second set of nodes such that the at least one node may operate as a child node during processing of the instance query and a parent node during processing of the summary query;
program code for causing each of the second set of nodes to process the summary query using results from the instance query on each respective child node; and
program code for storing results of the summary query to a specified location.

19. The computer program product of claim 18, further comprising:
program code for receiving an intermediate query;
program code for determining a third set of nodes to process the intermediate query, each of the third set of nodes being a parent to at least one child node of the first set of nodes and a child to one of the nodes in the second set of nodes; and
program code for causing each of the third set of nodes to process the intermediate query using results from the instance query on each child node,
wherein each of the second set of nodes is able to further process the summary query using results from the intermediate query on each child node.

20. The computer program product of claim 18, further comprising:
   program code for determining at least a third set of nodes to process results using the summary query, each of the third set of nodes being a parent to at least one child node of the second set of nodes and operable to process results of the summary query of each child node.

21. The computer program product of claim 18, wherein the hierarchical node structure is formed dynamically based at least in part upon the instance query and the summary query.

22. The computer program product of claim 18, wherein the cluster of nodes communicates using Web services and is scalable to add additional nodes, and
   wherein each node comprises at least one of a computing device and an instance on a computing device.

23. The computer program product of claim 18, further comprising:
   program code for tracking dependencies between jobs such that jobs for the second set of nodes are not processed until one or more corresponding jobs for the first set of nodes are processed.

24. The computer program product of claim 18, wherein the second set of nodes is determined dynamically based upon at least a current capacity of each node at a time for processing the summary query.

* * * * *